United States Patent
Gresset et al.

(10) Patent No.: US 11,032,782 B2
(45) Date of Patent: Jun. 8, 2021

(54) WIRELESS COMMUNICATION SYSTEM AND METHOD FOR BUILDING SIGNAL-TO-INTERFERENCE-PLUS-NOISE RATIO DATA

(71) Applicant: MITSUBISHI ELECTRIC CORPORATION, Tokyo (JP)

(72) Inventors: Nicolas Gresset, Rennes (FR); Hiroyasu Sano, Tokyo (JP); Kazumasa Suzuki, Tokyo (JP)

(73) Assignees: MITSUBISHI ELECTRIC CORPORATION, Tokyo (JP); MITSUBISHI ELECTRIC R&D CENTRE EUROPE B.V, Schiphol Rijk (NL)

( * ) Notice: Subject to any disclaimer, the term of this patent is extended or adjusted under 35 U.S.C. 154(b) by 34 days.

(21) Appl. No.: 16/493,251

(22) PCT Filed: Feb. 28, 2018

(86) PCT No.: PCT/JP2018/008666
§ 371 (c)(1),
(2) Date: Sep. 11, 2019

(87) PCT Pub. No.: WO2018/186097
PCT Pub. Date: Oct. 11, 2018

(65) Prior Publication Data
US 2020/0120614 A1 Apr. 16, 2020

(30) Foreign Application Priority Data
Apr. 3, 2017 (EP) .................................... 17164572

(51) Int. Cl.
*H04W 52/24* (2009.01)
*H04B 17/336* (2015.01)
(Continued)

(52) U.S. Cl.
CPC ........ *H04W 52/243* (2013.01); *G06F 17/142* (2013.01); *G06F 17/18* (2013.01); *H04B 17/336* (2015.01)

(58) Field of Classification Search
CPC .. H04W 52/243; H04B 17/336; G06F 17/142; G06F 17/18
See application file for complete search history.

(56) References Cited

U.S. PATENT DOCUMENTS

2014/0128117 A1* 5/2014 Kwun ................. H04W 52/243
455/513

OTHER PUBLICATIONS

Beaulieu et al., "Exact Performance Analysis of Multihop Relaying Systems Operating in Co-Channel Interference Using the Generalized Transformed Characteristic Function", Australasian Telecommunication Networks and Applications Conference, Nov. 9, 2011, 6 pages.

(Continued)

*Primary Examiner* — Will W Lin
(74) *Attorney, Agent, or Firm* — Birch, Stewart, Kolasch & Birch, LLP

(57) ABSTRACT

In a wireless communication system, SINR data are obtained from power measurements data, as follows: gathering first power measurements data of total power received during communications; gathering second power measurements data of in-transmission interference power; computing third power measurements data of useful power, from the first and second power measurements data; gathering fourth power measurements data of out-transmission interference power; merging the second and fourth power measurements data so as to form a set of fifth interference power data; computing a first characteristic function from the third power measurements data, and computing a second characteristic function from the fifth power measurements data; building a third characteristic function relating to the SINR (Continued)

data related to the transmission channel, by performing a term-by-term product of the first and second characteristic functions; computing a probability mass function from the third characteristic function.

14 Claims, 7 Drawing Sheets

(51) Int. Cl.
  *G06F 17/14* (2006.01)
  *G06F 17/18* (2006.01)

(56) References Cited

OTHER PUBLICATIONS

Haenggi et al., "Interference in Large Wireless Networks", Foundations and Trends in Networking, vol. 3, No. 2, 2008, pp. 127-248.

Hijaz et al., "Probability Density Function of SINR in Nakagami-m Fading with Different Channels", The University of Kansas, Aug. 2013, 5 pages.

Madhusudhanan et al., "Downlink Performance Analysis for a Generalized Shotgun Cellular System", arxiv.org, Cornell University Library, 201 Olin Library Cornell University Ithaca, NY 14853, Feb. 21, 2010, 30 pages.

Yue et al., "Characteristic Functions for Optimum-Combining Output SINR With AWGN and Correlated Interference", IEEE Transactions on Communications, vol. 55, No. 2, Feb. 2007, pp. 266-270.

\* cited by examiner

WIRELESS COMMUNICATION SYSTEM AND METHOD FOR BUILDING SIGNAL-TO-INTERFERENCE-PLUS-NOISE RATIO DATA

TECHNICAL FIELD

The present invention generally relates to building Signal-to-Interference-plus-Noise Ratio data from power measurements data in a context of wireless communications.

BACKGROUND ART

In wireless communications, Signal-to-Interference-plus-Noise Ratio (SINR) is defined as power of a certain signal of interest divided by a sum of power of interference (from all interfering signals) and power of some background noise.

Interference incurred by a receiver device, in the scope of a wireless communication in which the receiver device is expected to receive a signal from a source device, is defined as one or more signals transmitted by one or more respective other source devices to at least one other receiver device via the same transmission channel as used by said source device to communicate with said receiver device.

The receiver is able to exploit in-transmission power measurements, so as to gather useful signals power measurements data and concurrently in-transmission interference power measurements data (interference incurred during transmissions). To do so, the receiver makes power measurements of total power Pt during transmissions and makes measurements of interference power Pi by observing transmission channel candidate resources that are left unused by the transmissions. The receiver makes thus as many power measurements Pt of total power as power measurements Pi of in-transmission interference power. The receiver can deduce the useful signals power by subtracting the interference power samples Pi from their counterpart total power samples Pt. Moreover, the receiver can compute Signal-to-Interference-plus-Noise Ratio (SINR) by dividing the counterpart total power samples Pt by their counterpart interference power samples Pi. This can be achieved since there are as many power measurements Pt of total power as power measurements Pi of interference power.

It is therefore desirable to get rid of the constraints of having as many power measurements Pt of total power as power measurements Pi of interference power, so as to be able to bring flexibility in computing the SINR data. In such a way, bringing more interference measurements data would allow enhancing the accuracy of the SINR data, and consequently, when said SINR data are used to help defining transmission schemes in use over the transmission channel, bringing more interference measurements data would allow enhancing transmission performance over the transmission channel.

SUMMARY OF INVENTION

To that end, the present invention concerns a method for building Signal-to-Interference-plus-Noise Ratio data from power measurements data, the Signal-to-Interference-plus-Noise Ratio data relating to a transmission channel in a wireless communication system. The method is implemented by a device of the wireless communication system or cooperatively by plural devices of the wireless communication system, and the method comprises: gathering first power measurements data of total power received during communications performed on the transmission channel; gathering second power measurements data of in-transmission interference power received during said communications, as many second power measurements data being gathered as first power measurements data; computing third power measurements data of useful power, by subtracting the second power measurements data from the first power measurements data; gathering fourth power measurements data of out-transmission interference power received out of said communications on the transmission channel; merging the second power measurements data and the fourth power measurements data so as to form a set of fifth interference power data; computing a first characteristic function, or complex conjugate thereof, of the logarithm of the computed third power measurements data, and computing a second characteristic function, or complex conjugate thereof, of the logarithm of the fifth power measurements data or of the opposite of the logarithm of the fifth power measurements data; building a third characteristic function, or complex conjugate thereof, of the logarithm of Signal-to-Interference-plus-Noise Ratio data related to the transmission channel, by performing a term-by-term product of the first characteristic function and the second characteristic function, or complex conjugates thereof, when relying on the logarithm of the fifth power measurements data, or by performing a term-by-term division of the first characteristic function and the second characteristic function, or complex conjugates thereof, when relying on the opposite of the logarithm of the fifth power measurements data; and computing a first probability mass function from the third characteristic function, or complex conjugate thereof.

Thus, by relying on the aforementioned characteristics functions, it is possible to get rid of the constraints of having as many power measurements of total power as power measurements of interference power. It thus brings flexibility in computing the SINR data. In such a way, bringing more interference measurements data allows enhancing the accuracy of the SINR data, and consequently, when said SINR data are used to help defining transmission schemes in use over the transmission channel, bringing more interference measurements data allows enhancing transmission performance over the transmission channel.

According to a particular feature, the method further comprises merging the computed first probability mass function and a second probability mass function representative of Signal-to-Interference-plus-Noise Ratio data previously acquired with respect to the transmission channel.

Thus, SINR data can be easily built over time.

According to a particular feature, the first probability mass function $P_{SINR}$ represented in a form of a histogram with uniform bins width, is computed as follows:

$$P_{SINR} = \frac{1}{b} \cdot IFFT(\overline{CFr} \otimes e^{jdaL}) \otimes e^{jc(a+bK)}$$

wherein L is a vector such that L=[0, ..., N−1], K is also a vector such that K=[0, ..., N−1], and $\otimes$ represents a term-by-term product, and wherein $\overline{CFr}$ is the complex conjugate of the third characteristic function, a represents position of a starting bin of the histogram, b represents bin width, N represents quantity of bins in the histogram, c represents the lowest considered frequency and d is a discretization step value.

Thus, a cost-effective implementation in terms of processing time and resources is achieved.

According to a particular feature, the first probability mass function $P_{SINR}$, represented in a form of a histogram with uniform bins width, is computed as follows:

$$P_{SINR}(a+kb) = \frac{d}{2\pi}\sum_{\ell=0}^{N-1} \overline{CFr}(c+\ell d)e^{j(a+kb)(c+\ell d)}$$

with $k \in [0, \ldots, N-1]$, $\forall k$, wherein $\overline{CFr}$ is the complex conjugate of the third characteristic function, a represents position of a starting bin of the histogram, b represents bin width, N represents quantity of bins in the histogram, c represents the lowest considered frequency and d is a discretization step value.

Thus, the first probability mass function can be easily computed.

According to a particular feature, the lowest considered frequency c is set such that:

$$c = -\left(1 - \frac{1}{N}\right)\frac{\pi}{b}$$

Thus, the third characteristic function is accurately defined according to a sampling rate of the first probability mass function.

According to a particular feature, the transmission channel is between a first wireless radio unit of the wireless communication system and a second wireless radio unit, and wherein the wireless communication system further comprises a server connected to the first wireless radio unit, and wherein: the first wireless radio unit gathers the first, second and fourth power measurements data, computes the third measurement data, and transmits to the server the third measurement data associated with the second measurement data, as well as the fourth measurement data; and the server merges the second power measurements data and the fourth power measurements data, computes the first and second characteristic functions, or the complex conjugates thereof, builds the third characteristic function, or complex conjugate thereof, computes the first probability mass function, and merges the computed first probability mass function and the second probability mass function.

Thus, no computation is performed at the first wireless radio unit, when said wireless radio unit has low computational capabilities.

According to a particular feature, the transmission channel is between a first wireless radio unit of the wireless communication system and a second wireless radio unit, and wherein the wireless communication system further comprises a server connected to the first wireless radio unit, and wherein: the first wireless radio unit gathers the first, second and fourth power measurements data, computes the third measurement data, merges the second power measurements data and the fourth power measurements data, and transmits to the server the third measurement data, as well as the fifth measurement data; and the server computes the first and second characteristic functions, or the complex conjugates thereof, builds the third characteristic function, or complex conjugate thereof, computes the first probability mass function, and merges the computed first probability mass function and the second probability mass function.

Thus, the server receives the third and fifth measurement data and does not need to know how to compute the third measurement data from the first and second measurement data, or to merge the second and fourth measurement data. In other words, the server does not need to know the structure of the measurement. Furthermore, the computation complexity required at the first wireless radio unit is limited.

According to a particular feature, the transmission channel is between a first wireless radio unit of the wireless communication system and a second wireless radio unit, and wherein the wireless communication system further comprises a server connected to the first wireless radio unit, and wherein: the first wireless radio unit gathers the first, second and fourth power measurements data, computes the third measurement data, merges the second power measurements data and the fourth power measurements data, computes the first and second characteristic functions, or the complex conjugates thereof, and transmits to the server information representative of the first and second characteristic functions; and the server builds the third characteristic function, or complex conjugate thereof, computes the first probability mass function, and merges the computed first probability mass function and the second probability mass function.

Thus, the amount of data related to measurements and transmitted from the first wireless radio unit to the server is limited when the quantity of measurements samples is higher than the quantity of data characterizing the first and second characteristic functions.

According to a particular feature, the transmission channel is between a first wireless radio unit of the wireless communication system and a second wireless radio unit, and wherein the wireless communication system further comprises a server connected to the first wireless radio unit, and wherein: the first wireless radio unit gathers the first, second and fourth power measurements data, computes the third measurement data, merges the second power measurements data and the fourth power measurements data, computes the first and second characteristic functions, or the complex conjugates thereof, builds the third characteristic function, or complex conjugate thereof, and transmits to the server information representative of the third characteristic function; and the server computes the first probability mass function, and merges the computed first probability mass function and the second probability mass function.

Thus, the amount of data related to measurements and transmitted from the first wireless radio unit to the server is further limited when the quantity of measurements samples is higher than the quantity of data characterizing the third characteristic function.

According to a particular feature, the wireless communication system is a cellular telecommunication system and the transmission channel is between wayside base stations deployed along railroads on which trains are travelling and relay stations installed inside the trains so as to enable User Equipment located inside the trains to communicate via the cellular telecommunication system, and wherein the railroads are virtually cut into clusters and the probability mass function data relating to Signal-to-Interference-plus-Noise Ratio is stored in a database for each cluster.

According to a particular feature, the transmission channel is between a first wireless radio unit of the wireless communication system and a second wireless radio unit, and wherein the method is implemented by the first wireless radio unit.

Thus, the second wireless radio unit can take advantage of knowledge of SINR distribution observed by the first wireless radio unit for optimizing its transmission strategy.

The present invention also concerns a wireless communication system for building Signal-to-Interference-plus-Noise Ratio data from power measurements data, the Signalto-Interference-plus-Noise Ratio data relating to a transmission channel in the wireless communication system. The wireless communication system is such that a device of the wireless communication system or cooperatively plural devices of the wireless communication system comprise: means for gathering first power measurements data of total power received during communications performed on the transmission channel; means for gathering second power measurements data of in-transmission interference power received during said communications, as many second power measurements data being gathered as first power measurements data; means for computing third power measurements data of useful power, by subtracting the second power measurements data from the first power measurements data; means for gathering fourth power measurements data of out-transmission interference power received out of said communications on the transmission channel; means for merging the second power measurements data and the fourth power measurements data so as to form a set of fifth interference power data; means for computing a first characteristic function, or complex conjugate thereof, of the logarithm of the computed third power measurements data, and computing a second characteristic function, or complex conjugate thereof, of the logarithm of the fifth power measurements data or of the opposite of the logarithm of the fifth power measurements data; means for building a third characteristic function, or complex conjugate thereof, of the logarithm of Signal-to-Interference-plus-Noise Ratio data related to the transmission channel, by performing a term-by-term product of the first characteristic function and the second characteristic function, or complex conjugates thereof, when relying on the logarithm of the fifth power measurements data, or by performing a term-by-term division of the first characteristic function and the second characteristic function, or complex conjugates thereof, when relying on the opposite of the logarithm of the fifth power measurements data; and means for computing a first probability mass function from the third characteristic function, or complex conjugate thereof.

The present invention also concerns a computer program that can be downloaded from a communication network and/or stored on a non-transitory information storage medium that can be read by a processing device such as a microprocessor. This computer program comprises instructions for causing implementation of the aforementioned method, when said program is run by the processing device. The present invention also concerns a non-transitory information storage medium, storing such a computer program.

The characteristics of the invention will emerge more clearly from a reading of the following description of an example of embodiment, said description being produced with reference to the accompanying drawings.

DESCRIPTION OF EMBODIMENTS

Figure 1A:
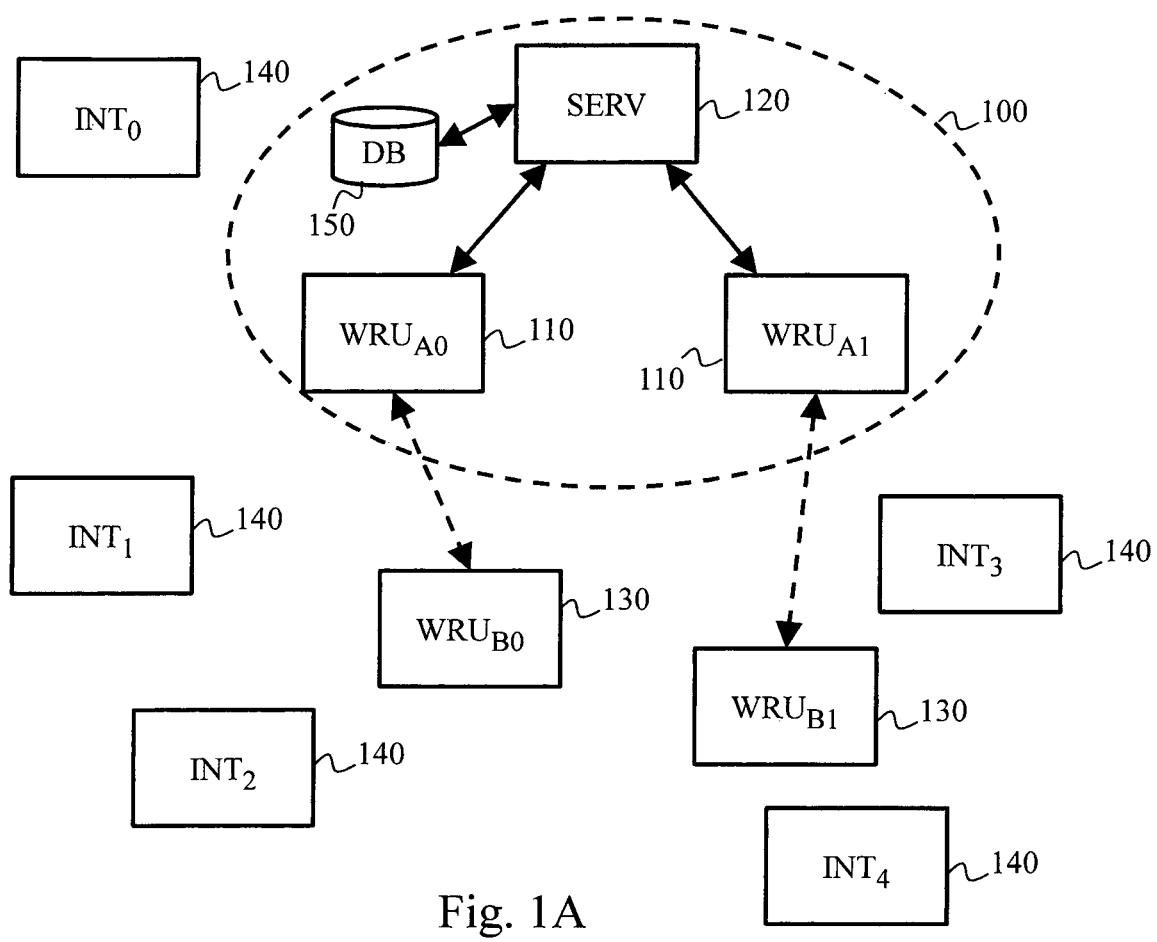
FIG. 1A schematically represents a wireless communication system in which the present invention may be implemented.

FIG. 1A schematically represents a wireless communication system 100 in which the present invention may be implemented.

In the scope of FIG. 1A, the wireless communication system 100 comprises a set of wireless radio units WRU, two of which being illustratively represented in FIG. 1A and referenced $WRU_{A0}$ and $WRU_{A1}$, as well as a server SERV 120 and a database DB 150. The wireless radio units $WRU_{A0}$ and $WRU_{A1}$ communicate wirelessly with other wireless radio units WRU, two of which being illustratively represented in FIG. 1A and referenced $WRU_{B0}$ and $WRU_{B1}$. By way of illustration, the wireless radio unit $WRU_{A0}$ communicates wirelessly with the wireless radio unit $WRU_{B0}$ and the wireless radio unit $WRU_{A1}$ communicates wirelessly with the wireless radio unit $WRU_{B1}$.

The wireless communication system 100 further comprises a server SERV 120 that is connected to each wireless radio unit WRU of the wireless communication system 100, namely to the wireless radio units $WRU_{A0}$ and $WRU_{A1}$ in FIG. 1A. The server SERV 120 thus acts as a coordinator for the wireless radio unit WRU of the wireless communication system 100. Links connecting the server 120 to each wireless radio unit WRU of the wireless communication system 100 are typically known as backhaul links, which may be wired, wireless or optical links. Intermediate relay devices may be present on way between said wireless radio units WRU and the server SERV 120, so as to create a logical communication between said wireless radio units WRU and the server SERV 120.

The wireless communication system 100 further comprises a database DB 150 connected to the server SERV 120, using a wired, wireless or optical link. The database DB 150 may be included in the server SERV 120. The server SERV 120 is then in charge of updating the database DB 150, from power measurements data performed by the wireless radio units $WRU_{A0}$ and $WRU_{A1}$ and/or from the wireless radio units $WRU_{B0}$ and $WRU_{B1}$. The database DB 150 stores probability mass function data relating to Signal-to-Interference-plus-Noise Ratio achieved via the wireless transmission channel of the communication system 100.

Illustratively, the wireless communication system 100 is a cellular telecommunication system, and the wireless radio units WRU of the wireless communication system 100, namely the wireless radio units $WRU_{A0}$ and $WRU_{A1}$ in FIG. 1A, are base stations of said wireless telecommunications system. The wireless radio units $WRU_{B0}$ and $WRU_{B1}$ are thus known as User Equipment, such as smartphones. The server SERV 120 thus acts as a coordinator for the base stations so as to allow configuring transmission schemes applied by the base stations in order to improve overall performance of the communications from the base stations to the wireless radio units $WRU_{B0}$ and $WRU_{B1}$ (downlink communications) and/or from the wireless radio units $WRU_{B0}$ and $WRU_{B1}$ to the base stations (uplink communications). The server SERV 120 may further act as a coordinator for the base stations so as to allow implementing handover procedure between the base stations and/or any other cooperative procedure between the base stations.

In a more particular example, the wireless communication system 100 is a cellular telecommunication system and the wireless radio units WRU of the wireless communication system 100, namely the wireless radio units $WRU_{A0}$ and $WRU_{A1}$ in FIG. 1A, are wayside base stations deployed along railroads on which trains are travelling. The wireless radio units $WRU_{B0}$ and $WRU_{B1}$ may in this context be relay stations installed inside the trains so as to enable User Equipment located inside the trains to communicate via the cellular telecommunication system. In this example, the railroads are virtually cut into clusters (portions of the railroads) and the database DB 150 stores probability mass function data relating to Signal-to-Interference-plus-Noise Ratio for each cluster. Thus statistical data about Signal-to-Interference-plus-Noise Ratio can be used to improve the communications when any train moves from one cluster to a following one over its journey on the railroads.

Interferer devices are present in the environment surrounding the wireless radio units $WRU_{A0}$ and $WRU_{A1}$ and/or the wireless radio units $WRU_{B0}$ and $WRU_{B1}$. It means that interference is consequently incurred by the communications from the wireless radio units $WRU_{A0}$ and $WRU_{A1}$ to the wireless radio units $WRU_{B0}$ and $WRU_{B1}$ and/or by the communications from the wireless radio units $WRU_{B0}$ and $WRU_{B1}$ to the wireless radio units $WRU_{A0}$ and $WRU_{A1}$. Such interference occurs since the interferer devices generate radio signals using frequency resources that are part of the candidate frequencies used for setting up a transmission channel to perform the communications between the wireless radio units $WRU_{A0}$ and $WRU_{A1}$ and the wireless radio units $WRU_{B0}$ and $WRU_{B1}$, and because the wireless radio units $WRU_{A0}$ and $WRU_{A1}$ and/or the wireless radio units $WRU_{B0}$ and $WRU_{B1}$ are located within the range of the radio signals generated by the interferer devices. Illustratively, five interferer devices $INT_0$, $INT_1$, $INT_2$, $INT_3$ and $INT_4$ are schematically shown in FIG. 1A.

Figure 1B:
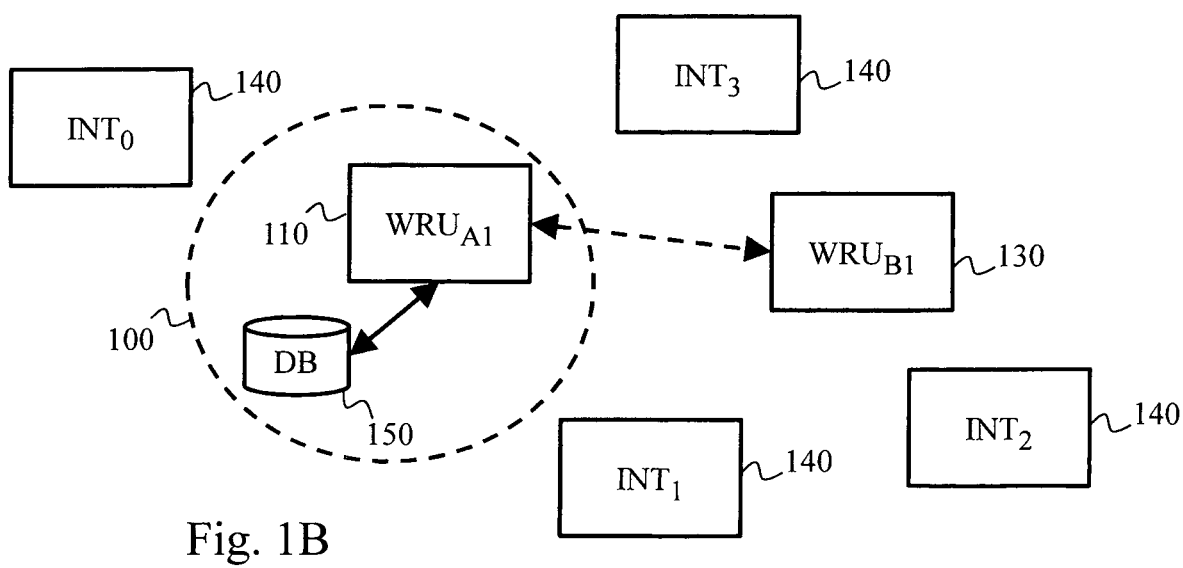
FIG. 1B schematically represents another wireless communication system in which the present invention may be implemented.

FIG. 1B schematically represents another wireless communication system 100 in which the present invention may be implemented.

In the scope of FIG. 1B, the wireless communication system 100 comprises the wireless radio unit $WRU_{A1}$, as well as the database DB 150. The wireless radio units $WRU_{A1}$ communicate wirelessly with another wireless radio unit WRU, namely the wireless radio unit $WRU_{B1}$.

The database DB 150 is in this case connected to the wireless radio unit $WRU_{A1}$, using a wired, wireless or optical link. The database DB 150 may be included in the wireless radio unit $WRU_{A1}$. The wireless radio unit $WRU_{A1}$ is then in charge of updating the database DB 150, from power measurements data performed by the wireless radio unit $WRU_{B1}$. As in the scope of FIG. 1A, the database DB 150 stores SINR related data.

Interferer devices are present in the environment surrounding the wireless radio unit $WRU_{A1}$ and/or the wireless radio unit $WRU_{B1}$. It means that interference is consequently incurred by the communications from the wireless radio unit $WRU_{A1}$ to the wireless radio unit $WRU_{B1}$ and/or by the communications from the wireless radio unit $WRU_{B1}$ to the wireless radio unit $WRU_{A1}$. Such interference occurs since the interferer devices generate radio signals using frequency resources that are part of the candidate frequencies used for setting up the transmission channel to perform the communications between the wireless radio unit $WRU_{A1}$ and the wireless radio unit $WRU_{B1}$, and because the wireless radio unit $WRU_{A1}$ and/or the wireless radio unit $WRU_{B1}$ are located within the range of the radio signals generated by the interferer devices. Illustratively, four interferer devices $INT_0$, $INT_1$, $INT_2$ and $INT_3$ are schematically shown in FIG. 1B.

Illustratively, the wireless communication system 100 is a Wireless Local Area Network and the wireless radio unit $WRU_{A1}$ is an Access Point for managing said Wireless Local Area Network, whereas the wireless radio unit $WRU_{B1}$ is a mobile station registered within the Wireless Local Area Network.

Figure 2:
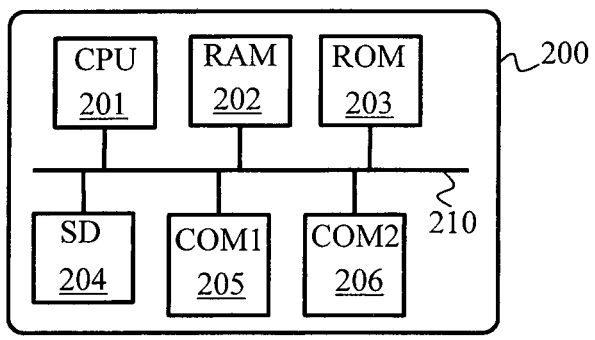
FIG. 2 schematically represents an architecture of a wireless radio unit of the wireless communication system and/or of a server of the wireless communication system.

FIG. 2 schematically represents a hardware architecture 200 of the wireless radio units $WRU_{A0}$ and $WRU_{A1}$ and/or the wireless radio units $WRU_{B0}$ and $WRU_{B1}$ and/or of the server SERV 120. Let's illustratively consider that FIG. 2 schematically represents the hardware architecture 200 of the server SERV 120.

According to the shown hardware architecture 200, the server SERV 120 comprises at least the following components interconnected by a communications bus 210: a processor, microprocessor, microcontroller or CPU (Central Processing Unit) 201; a RAM (Random-Access Memory) 202; a ROM (Read-Only Memory) 203; an HDD (Hard-Disk Drive) or an SD (Secure Digital) card reader 204, or any other device adapted to read information stored on non-transitory information storage medium; a communication interface COM1 205; and potentially another communication interface COM2 206.

When the hardware architecture 200 concerns the server SERV 120, the communication interface COM1 205 enables the server SERV 120 to communicate with the wireless radio units $WRU_{A0}$ and $WRU_{A1}$. The communication interface COM1 205 may further enable the server SERV 120 to communicate with the wireless radio units $WRU_{B0}$ and $WRU_{B1}$ via the wireless radio units $WRU_{A0}$ and $WRU_{A1}$ acting a relays.

When the hardware architecture 200 concerns the wireless radio units $WRU_{A0}$ and $WRU_{A1}$, the communication interface COM1 205 enables the wireless radio units $WRU_{A0}$ and WRU$_{A1}$ to communicate with the wireless radio units WRU$_{B0}$ and WRU$_{B1}$, and the communication interface COM2 206 enables the wireless radio units WRU$_{A0}$ and WRU$_{A1}$ to communicate with the server SERV 120.

When the hardware architecture 200 concerns the wireless radio units WRU$_{B0}$ and WRU$_{B1}$, the communication interface COM1 205 enables the wireless radio units WRU$_{B0}$ and WRU$_{B1}$ to communicate with the wireless radio units WRU$_{A0}$ and WRU$_{A1}$.

Reverting back to the description of FIG. 2 by illustratively relying on the server SERV 120, CPU 201 is capable of executing instructions loaded into RAM 202 from ROM 203 or from an external memory, such as an SD card via the SD card reader 204. After the server SERV 120 has been powered on, CPU 201 is capable of reading instructions from RAM 202 and executing these instructions. The instructions form one computer program that causes CPU 201 to perform some or all of the steps of the algorithm described hereafter.

Consequently, it is understood that any and all steps of the algorithm described hereafter may be implemented in software by execution of a set of instructions or program by a programmable computing machine, such as a PC (Personal Computer), a DSP (Digital Signal Processor) or a microcontroller; or else implemented in hardware by a machine or a dedicated chip or chipset, such as an FPGA (Field-Programmable Gate Array) or an ASIC (Application-Specific Integrated Circuit).

In general, the wireless radio-units WRU$_{A0}$ and WRU$_{A1}$, and the wireless radio units WRU$_{B0}$ and WRU$_{B1}$, as well as the server SERV 120, comprise processing electronics circuitry configured for implementing the relevant steps as described herein with respect to the device in question.

Figure 3A:
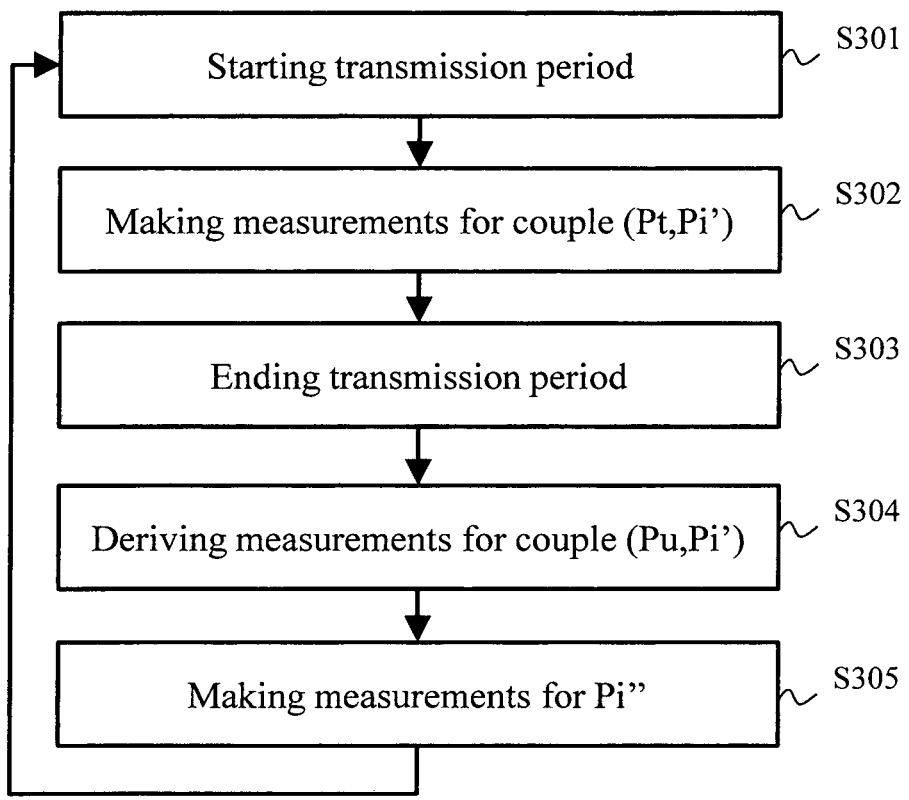
FIG. 3A schematically represents an algorithm for collecting power measurement data.

FIG. 3A schematically represents an algorithm for collecting power measurement data, which are then processed as detailed hereafter for updating the database DB 150. The algorithm of FIG. 3A is performed by at least one wireless radio unit WRU in charge of providing the power measurement data to be further processed for updating the database DB 150.

In the scope of FIG. 1A, the algorithm of FIG. 3A is performed by the wireless radio units WRU$_{A0}$ and WRU$_{A1}$, which then communicate the collected power measurement data, or information representative thereof or data derived from said collected power measurement data, to the server SERV 120. In a variant embodiment, the algorithm of FIG. 3A is performed by the wireless radio units WRU$_{B0}$ and WRU$_{B1}$, which then communicate the collected power measurement data, or information representative thereof or data derived from said collected power measurement data, to the server SERV 120 (by using the wireless radio units WRU$_{A0}$ and WRU$_{A1}$ as relays). In another variant embodiment, the algorithm of FIG. 3A is performed by the wireless radio units WRU$_{A0}$ and WRU$_{A1}$, as well as by the wireless radio units WRU$_{B0}$ and WRU$_{B1}$, which then communicate the collected power measurement data, or information representative thereof or data derived from said collected power measurement data, to the server SERV 120.

In the scope of FIG. 1B, the algorithm of FIG. 3A is performed by the wireless radio unit WRU$_{B1}$, which then communicates the collected power measurement data, or information representative thereof or data derived from said collected power measurement data, to the wireless radio unit WRU$_{A1}$. In a variant embodiment, the algorithm of FIG. 3A is performed by the wireless radio units WRU$_{A1}$, which then processes on its own the collected power measurement data.

Let's illustratively consider that the algorithm of FIG. 3A is performed by the wireless radio unit WRU$_{A1}$.

In a step S301, the wireless radio unit WRU$_{A1}$ detects that a transmission period starts, during which communications are performed between the wireless radio unit WRU$_{A1}$ and the wireless radio unit WRU$_{B1}$. For example, the communications between the wireless radio unit WRU$_{A1}$ and the wireless radio unit WRU$_{B1}$ are scheduled according to a Time Division Multiple Access approach and the wireless radio unit WRU$_{A1}$ knows at which instant start and end time slots dedicated to said communications between the wireless radio unit WRU$_{A1}$ and the wireless radio unit WRU$_{B1}$. In another example, the communications between the wireless radio unit WRU$_{A1}$ and the wireless radio unit WRU$_{B1}$ are performed in a non synchronized fashion, where the concerned receiver among the wireless radio unit WRU$_{A1}$ and the wireless radio unit WRU$_{B1}$ monitors the received power according to a known pilot signal placed at the beginning of each transmitted packet or frame. The transmission can be done on a single frequency channel, i.e. the same frequency carrier is used for all packets or frames transmissions, which involves that the receiver in question always knows the frequency resource used by the transmitter. When a frequency hopping technique is used according to a frequency hoping sequence, the frequency hopping sequence shall be known by the receiver or a signalling method shall be installed on a given frequency channel in order for the receiver to be able to be informed by the transmitter about the frequency resource used for transmission. In the most general case, it is assumed that, for a given time slot or period, only a sub-part of all the candidate frequency resources of the transmission channel is used for actually transmitting the useful signals. This involves that, by observing the whole transmission channel, the receiver observes resources on which said receiver receives useful data corrupted by interference and noise, and on the remaining candidate frequency resources, it observes only interference and noise.

In a step S302, the wireless radio unit WRU$_{A1}$ makes measurements of total power Pt observed during the transmission period. The total power Pt is decomposed as follows:

$$Pt=Pu+Pi'$$

wherein Pu represents power of useful signals resulting from the communications made during the transmission period, and wherein Pi' represents power of in-transmission interference incurred during the transmission period. For simplicity considerations, the power of interference also includes the thermal noise power.

Moreover, during the step S302, the wireless radio unit WRU$_{A1}$ makes measurements of the in-transmission interference power Pi' incurred during the transmission period. To do so, the wireless radio unit WRU$_{A1}$ determines which frequency resources are effectively used among the candidate frequency resources for performing the communications in question during the transmission period (either pre-set or signalled).

On one hand, the total power Pt is observed over all the candidate frequency resources. On the other hand, the in-transmission interference power Pi' is observed only on the frequency resources among the candidate frequency resources which are not effectively used for performing the communications in question during the transmission period. For instance, when the communications between the wireless radio unit WRU$_{A1}$ and the wireless radio unit WRU$_{B1}$ rely on Orthogonal Frequency-Division Multiplexing (OFDM), the measurements of the total power Pt are performed on the carrier frequencies effectively in use and the measurements of the in-transmission interference power Pi' are performed on the carrier frequencies that thus remained unused during said communications.

The measurements of the total power Pt and the measurements of the in-transmission interference power Pi' are preferably made simultaneously; otherwise, the time gap between making the measurements of the total power Pt and making the measurements of the in-transmission interference power Pi' has to be short enough to be able to consider that the transmission channel and the interference are invariant over said time gap.

In a step S303, the wireless radio unit $WRU_{A1}$ detects that the transmission period in question ends. At that instant, the wireless radio unit $WRU_{A1}$ has collected for the transmission period in question as many data relating to the total power Pt as data relating to the in-transmission interference power Pi'.

In a step S304, the wireless radio unit $WRU_{A1}$ derives data relating to the useful signals power Pu from the measurements of the total power Pt and the measurements of the in-transmission interference power Pi'. To do so, the wireless radio unit $WRU_{A1}$ subtracts over time the measurements of the in-transmission interference power Pi' from the measurements of the total power Pt. The wireless radio unit $WRU_{A1}$ thus associates the data relating to the useful signals power Pu with the data relating to the corresponding in-transmission interference power Pi' that allowed obtaining respectively said data relating to the useful signals power Pu.

In a step S305, the wireless radio unit $WRU_{A1}$ makes measurements of out-transmission interference power Pi" observed out of any transmission period, i.e. when no communications are scheduled between the wireless radio unit $WRU_{A1}$ and the wireless radio unit $WRU_{B1}$. Since the wireless radio unit $WRU_{A1}$ collects measurements of such out-transmission interference power Pi", it means that the wireless radio unit $WRU_{A1}$ collects more measurements of interference power Pi={Pi', Pi"} than measurements of total power Pt, and consequently the wireless radio unit $WRU_{A1}$ has more data relating to the interference power Pi than to the useful signals power Pu.

The steps S301 to S305 are then reiterated when starts a new transmission period, during which communications are performed between the wireless radio unit $WRU_{A1}$ and the wireless radio unit $WRU_{B1}$.

Figure 3B:
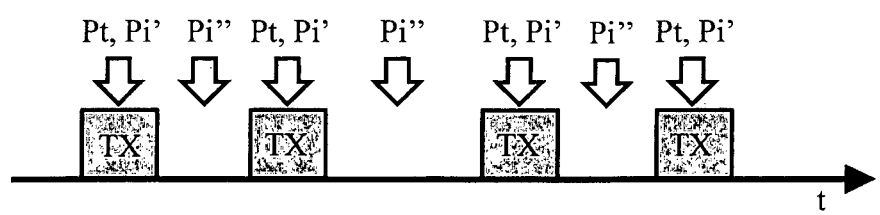
FIG. 3B schematically represents successive power measurements made over time in the scope of the present invention.

FIG. 3B schematically represents successive power measurements made over time in the scope of the present invention, so as to enhance explanations provided hereinbefore with respect to FIG. 3A.

Time periods of transmission (in grey in FIG. 3B) between the wireless radio unit $WRU_{A1}$ and the wireless radio unit $WRU_{B1}$ are present between time periods without transmissions between the wireless radio unit $WRU_{A1}$ and the wireless radio unit $WRU_{B1}$. During the time periods of transmission between the wireless radio unit $WRU_{A1}$ and the wireless radio unit $WRU_{B1}$, power measurements are made for total power Pt and for in-transmission interference power Pi'. And during the time periods without transmissions between the wireless radio unit $WRU_{A1}$ and the wireless radio unit $WRU_{B1}$, power measurements are made for out-transmission interference power Pi".

Figure 4A:
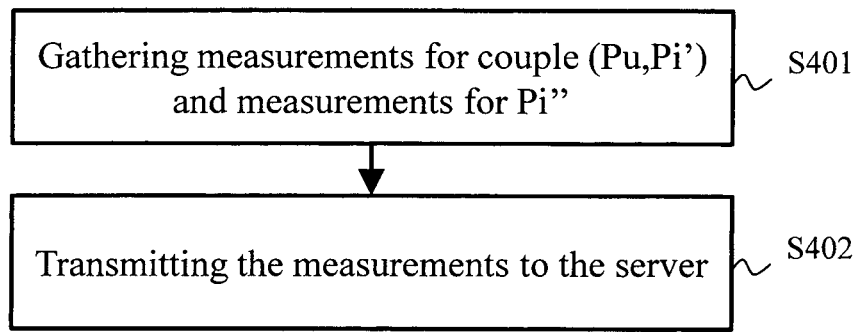
FIG. 4A schematically represents one of two complementary algorithms for updating a database of the wireless communication system, according to a first embodiment.
Figure 4B:
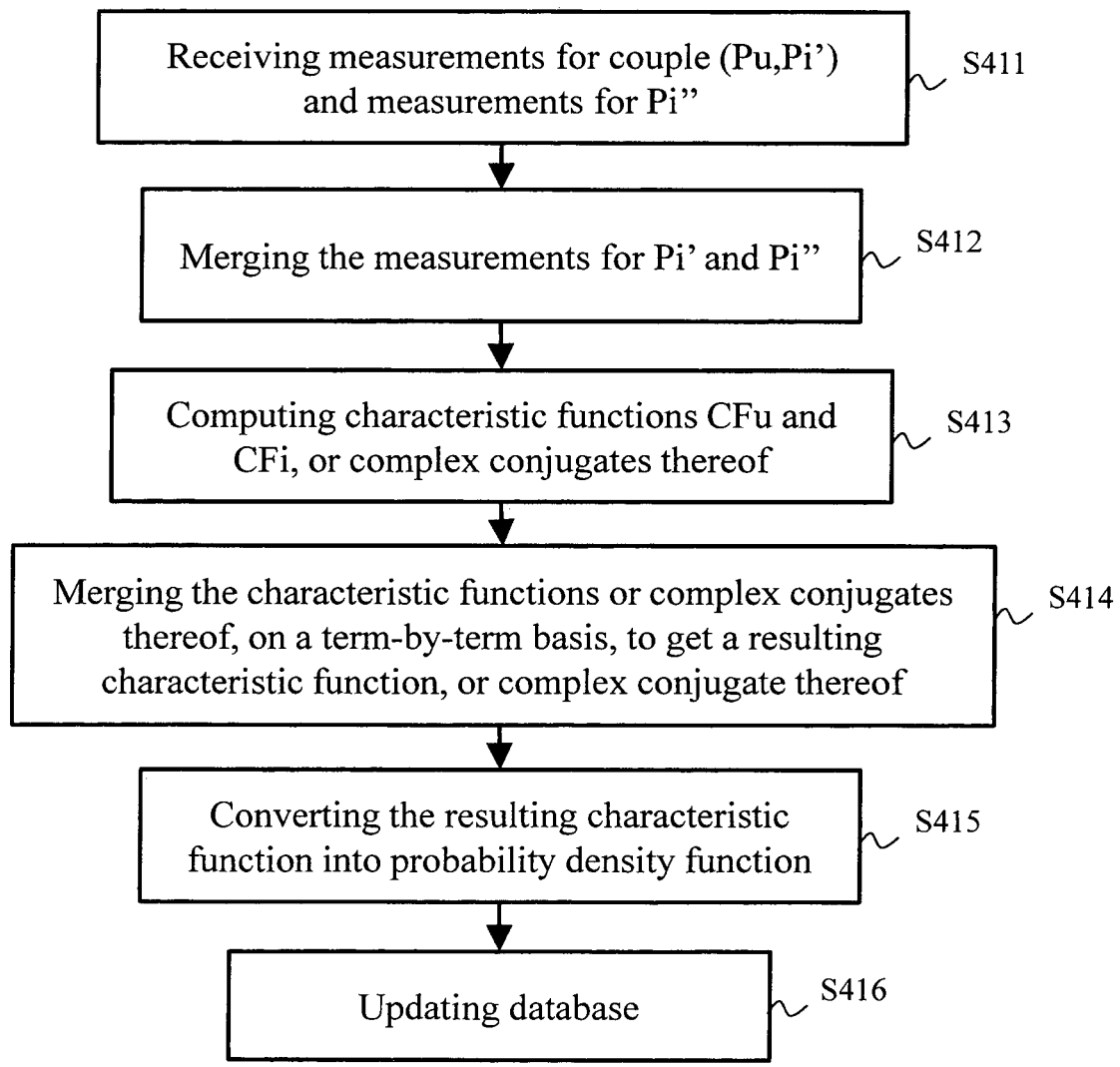
FIG. 4B schematically represents another one of two complementary algorithms for updating a database of the wireless communication system, according to a first embodiment.
Figure 5A:
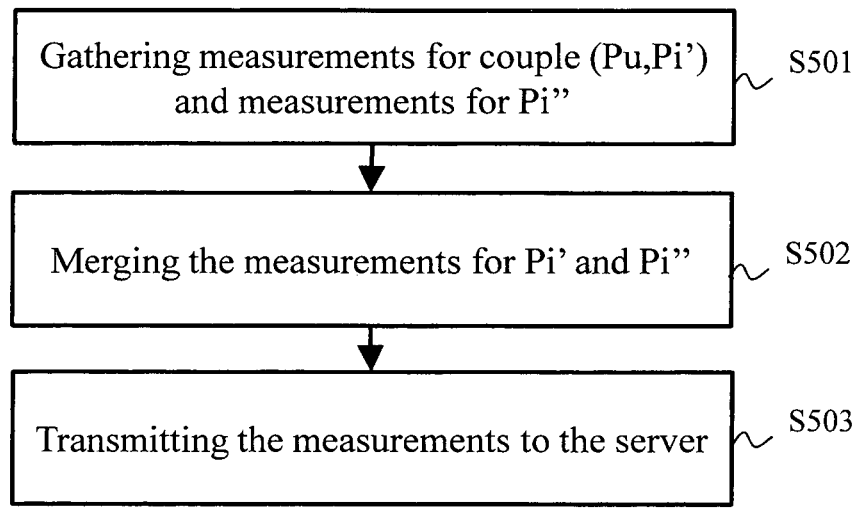
FIG. 5A schematically represents one of two complementary algorithms for updating the database of the wireless communication system, according to a second embodiment.
Figure 5B:
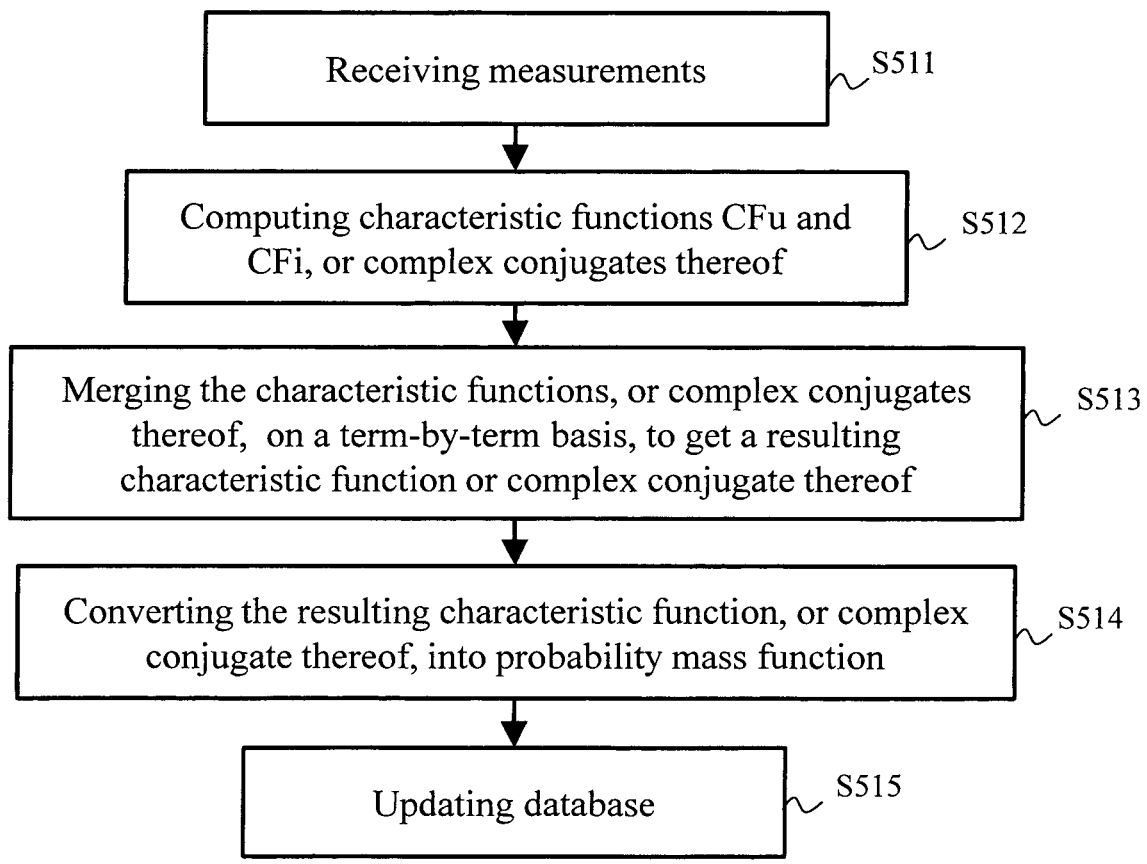
FIG. 5B schematically represents another one of two complementary algorithms for updating the database of the wireless communication system, according to a second embodiment.
Figure 6A:
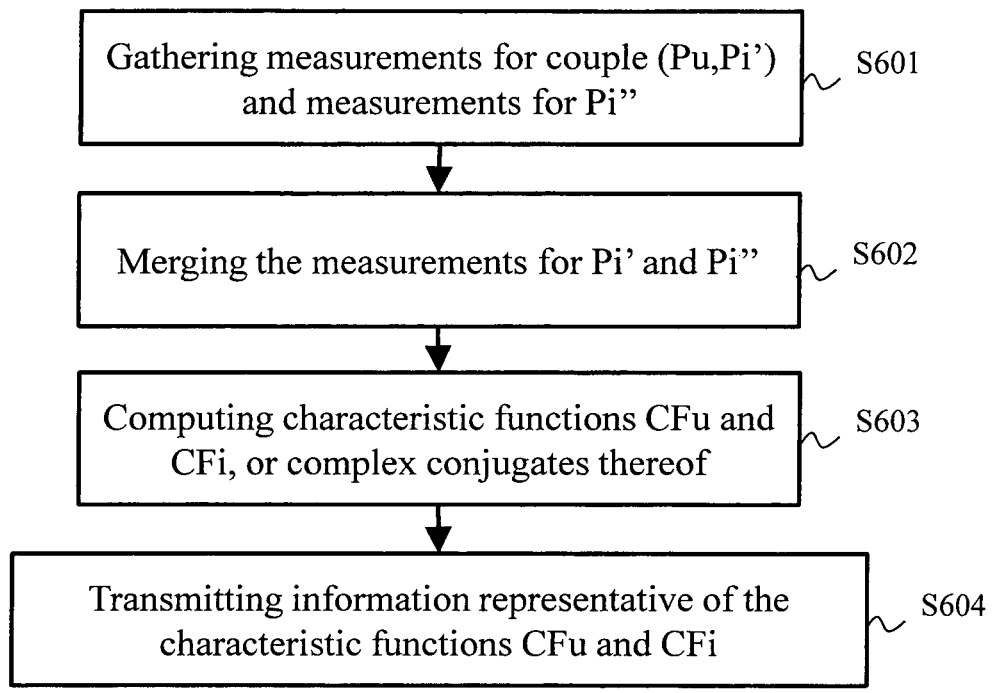
FIG. 6A schematically represents one of two complementary algorithms for updating the database of the wireless communication system, according to a third embodiment.
Figure 6B:
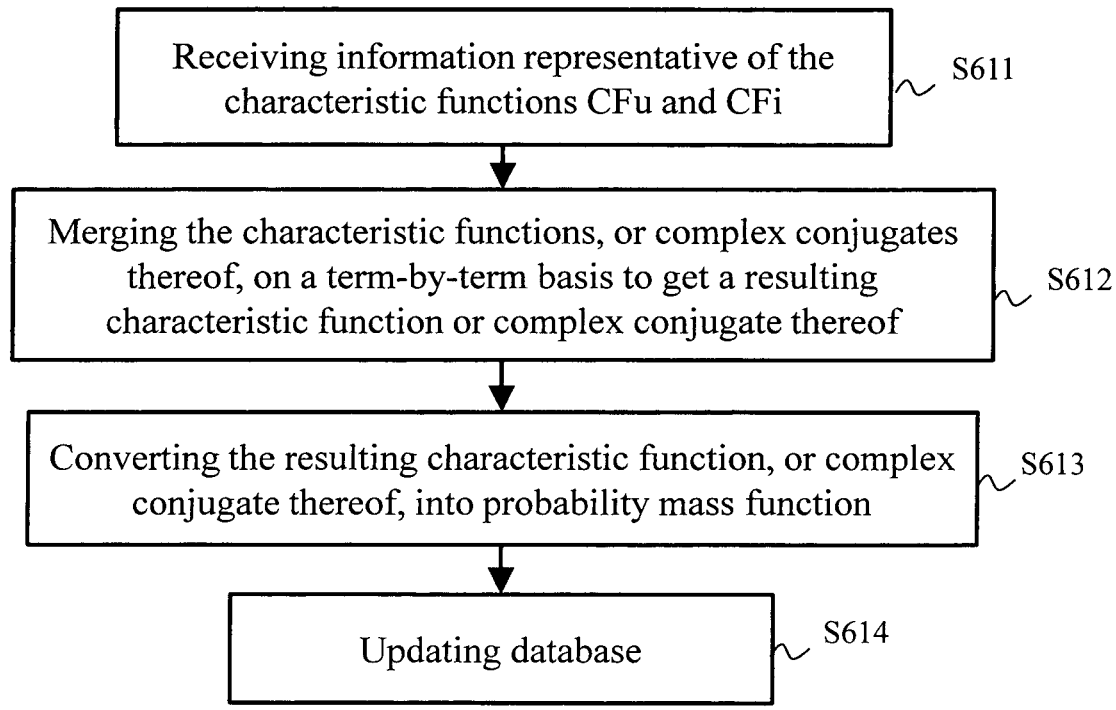
FIG. 6B schematically represents another one of two complementary algorithms for updating the database of the wireless communication system, according to a third embodiment.
Figure 7A:
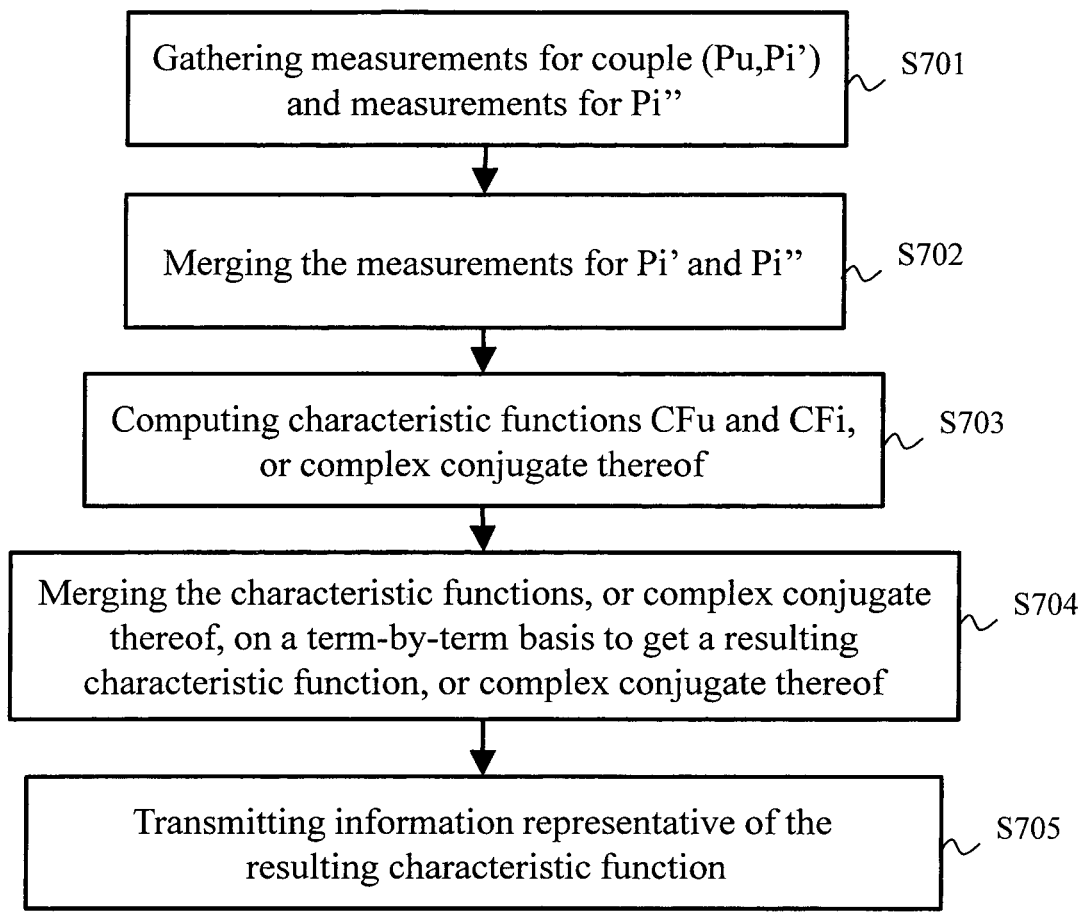
FIG. 7A schematically represents one of two complementary algorithms for updating the database of the wireless communication system, according to a fourth embodiment.
Figure 7B:
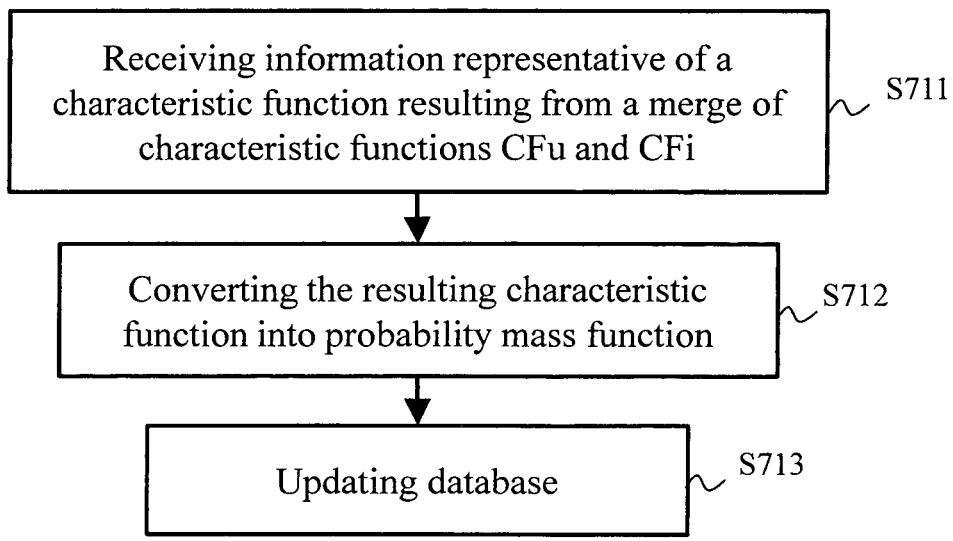
FIG. 7B schematically represents another one of two complementary algorithms for updating the database of the wireless communication system, according to a fourth embodiment.

FIGS. 4A and 4B jointly represent a first embodiment, FIGS. 5A and 5B jointly represent a second embodiment, FIGS. 6A and 6B jointly represent a third embodiment and FIGS. 7A and 7B jointly represent a fourth embodiment, all implying cooperation between a first device and a second device. According to a first example, with respect to FIG. 1A, the first device is the wireless radio unit $WRU_{A1}$ (or the wireless radio unit $WRU_{A0}$) and the second device is the server SERV 120. According to a second example, with respect to FIG. 1A, the first device is the wireless radio unit $WRU_{B1}$ (or the wireless radio unit $WRU_{B0}$) and the second device is the server SERV 120, the wireless radio unit $WRU_{A1}$ (respectively the wireless radio unit $WRU_{A0}$) then acting as a relay between the wireless radio unit $WRU_{B1}$ (respectively the wireless radio unit $WRU_{B0}$) and the server SERV 120. According to a third example, with respect to FIG. 1B, the first device is the wireless radio unit $WRU_{B1}$ and the second device is the wireless radio unit $WRU_{A1}$.

Figure 8:
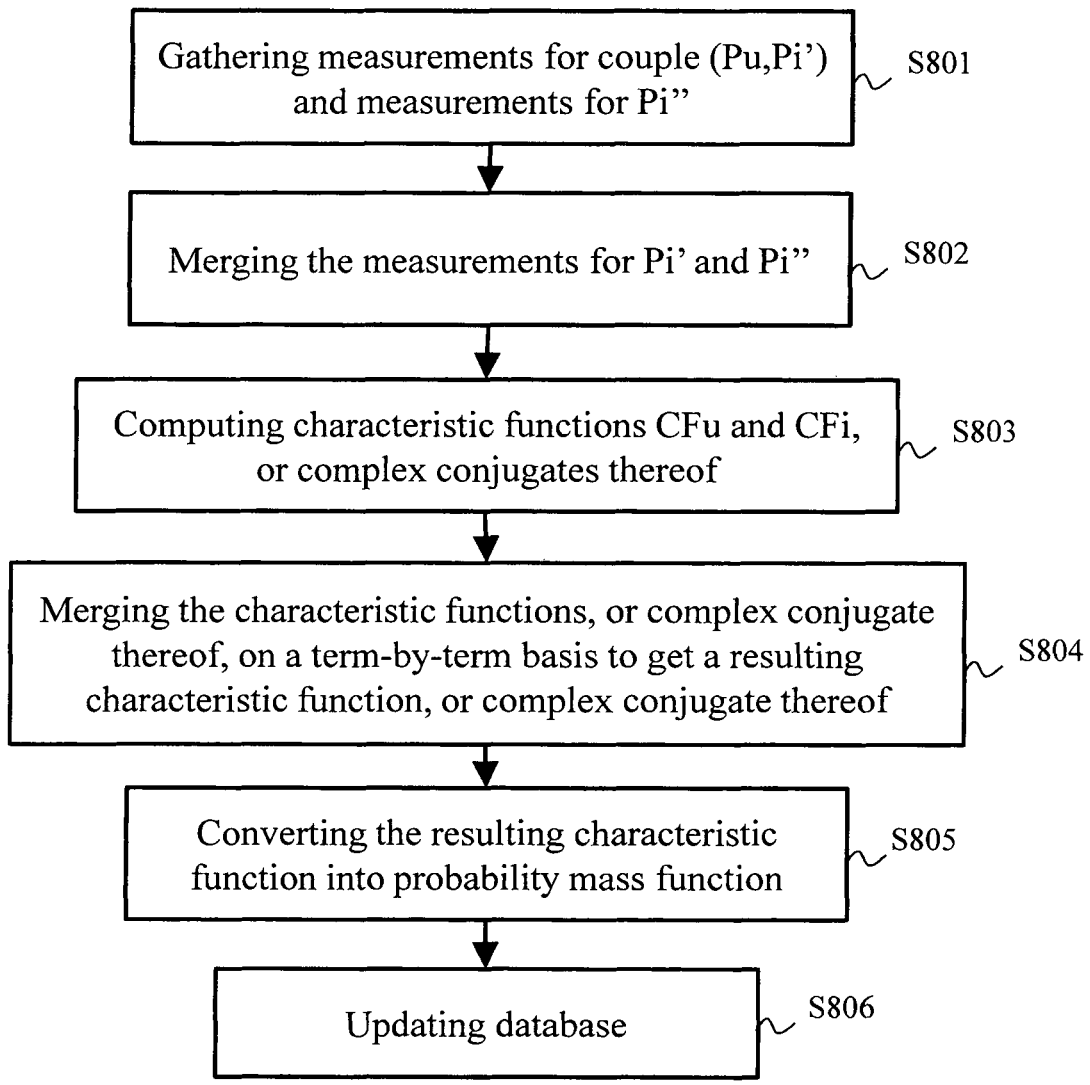
FIG. 8 schematically represents an algorithm for updating the database of the wireless communication system, according to a fifth embodiment.

Furthermore, FIG. 8 represents a fifth embodiment in which a single device performs all the steps on its own. For example, with respect to FIG. 1B, such a single device is the wireless radio unit $WRU_{A1}$.

FIGS. 4A and 4B schematically represent two complementary algorithms for updating the database DB 150, according to the first embodiment. In this first embodiment, the first device gathers the measurements for the couple formed by the useful signals power Pu and the in-transmission interference power Pi', as well as the measurements for the out-transmission interference power Pi". Said first device then transmits the measurements data for the couple formed by the useful signals power Pu and the in-transmission interference power Pi', as well as the measurements for the out-transmission interference power Pi", to the second device, which then processes said data so as to be able to update the database DB 150.

Thus, referring to FIG. 4A, in a step S401, the first device gathers measurements data as described hereinbefore with respect to FIG. 3A.

Then, in a step S402, the first device transmits the data relating to the useful signals power Pu (obtained from the measurements of the total power Pt and the measurements of the in-transmission interference power Pi') and their associated data relating to the in-transmission interference power Pi', as well as the extra data relating to the out-transmission interference power Pi".

The algorithm of FIG. 4A can be reiterated over time so as to keep the second device up-to-date with respect to the power measurements data.

Turning to FIG. 4B, in a step S411, the second device receives the data transmitted by the first device in the step S402.

In a step S412, the second device merges the data related to the in-transmission interference power Pi' and the data related to the out-transmission interference power Pi" so as to form a set of data related, considered as a whole, to the interference power Pi={Pi', Pi"}.

In a step S413, the second device determines information representative of a first characteristic function CFu of the logarithm of the received data relating to the useful signals power Pu and information representative of a second characteristic function CFi relating to the opposite of the logarithm of the interference power Pi. In a variant embodiment, the second device simply uses the logarithm of the interference power Pi instead of the opposite of the logarithm of the interference power Pi. In a variant embodiment, the information representative of the characteristic functions in question is either coefficients of said characteristic functions or coefficients of the respective complex conjugate of said characteristic functions.

According to a particular embodiment, the characteristic function CFu, or the complex conjugate thereof, is computed directly from the logarithm of the received data relating to the useful signals power Pu. Similarly, the characteristic function CFi, or the complex conjugate thereof, is computed directly from the opposite of the logarithm of the merged date relating to the interference power Pi, or directly from the logarithm of the merged date relating to the interference power Pi (depending on which one is looked for in the step S413).

More precisely, let X be a real random variable with probability density function $P_X(x)$. The complex conjugate $\overline{\varphi}_X(v)$ of the characteristic function $\varphi_X(v)$ of the real random variable X with frequency parameter v is defined as follows:

$$\overline{\varphi}_X(v) = E[e^{-jvX}] = \int P_X(x) e^{-jvx} dx$$

which can be approximated as follows, when considering that X is a discrete random variable with samples $X_i$, $i \in [1, \ldots, N]$, wherein N thus represents the quantity of discrete data $X_i$ considered to obtain the complex conjugate $\overline{\varphi}_X(v)$ of the characteristic function $\varphi_X(v)$:

$$\overline{\varphi}_X(v) = \frac{1}{N} \sum_{i=1}^{N} e^{-jvX_i}$$

Applied to the complex conjugate of the characteristic function CFu, it leads to the following relationship:

$$\overline{CFu}(v) = \frac{1}{N_u} \sum_{i=1}^{N_u} e^{-jvY_i}$$

wherein $Y_i$ represents the logarithm of the data, indexed by i as a function of the frequency parameter v, relating to the useful signals power Pu, and wherein $N_u$ represents the quantity of said data relating to the useful signals power Pu.

Applied to the complex conjugate of the characteristic function CFi, it leads to the following relationship:

$$\overline{CFi}(v) = \frac{1}{N_i} \sum_{h=1}^{N_i} e^{-jvZ_h}$$

wherein $Z_h$ represents the opposite of the logarithm of the data, indexed by h as a function of the frequency parameter v, relating to the interference signals power Pi.

According to another particular embodiment, the characteristic function CFu, or the complex conjugate thereof, is computed from the probability mass function computed beforehand from the logarithm of the received data relating to the useful signals power Pu. Similarly, the characteristic function CFi, or the complex conjugate thereof, is computed from the probability mass function computed beforehand from the opposite of the logarithm of the merged data relating to the interference power Pi.

In a step S414, the second device merges the characteristic function CFu and the characteristic function CFi, or their complex conjugates, using a term-by-term product to obtain a resulting characteristic function CFr, when the characteristic function CFi, or the complex conjugate thereof, relates to the opposite of the logarithm of the merged data relating to the interference power Pi. It means that, for each candidate value $v_k$ of the frequency parameter v:

$$CFr(v_k) = CFu(v_k) * CFi(v_k)$$

or equivalently $$\overline{CFr}(v_k) = \overline{CFu}(v_k) * \overline{CFi}(v_k)$$

wherein $\overline{CFr}$ represents the complex conjugate of the resulting characteristic function CFr.

Otherwise, when the characteristic function CFi, or the complex conjugate thereof, relates to the logarithm of the merged data relating to the interference power Pi, the second device merges the characteristic function CFu, or respectively the complex conjugate thereof, and the characteristic function CFi, or respectively the complex conjugate thereof, using a term-by-term division of the characteristic function CFu, or respectively the complex conjugate thereof, by the characteristic function CFi, or respectively the complex conjugate thereof. It means that, for each candidate value $v_k$ of the frequency parameter v:

$$CFr(v_k) = CFu(v_k) / CFi(v_k)$$

or equivalently $$\overline{CFr}(v_k) = \overline{CFu}(v_k) / \overline{CFi}(v_k)$$

Hence, the resulting characteristic function CFr, or the complex conjugate thereof, is the characteristic function, or respectively the complex conjugate thereof, of the logarithm of the Signal-to-Interference-plus-Noise Ratio achieved via the wireless transmission channel that led to the measurements representative of the useful signals power Pu and of the interference power Pi.

In a step S415, the second device computes the probability mass function of said Signal-to-Interference-plus-Noise Ratio from the resulting characteristic function CFr, or from the complex conjugate thereof.

More precisely, still considering that X is a real random variable, the probability density function $P_X(x)$ is defined as follows:

$$P_X(x) = \frac{1}{2\pi} \int \overline{\varphi}_X(v) e^{jvx} dv$$

which is approximated as follows, when considering that X is a discrete random variable and further considering that the probability mass function is in form of histogram with equally spaced bins:

$$P_X(a + kb) = \frac{d}{2\pi} \sum_{\ell=0}^{N-1} \overline{\varphi}_X(c + \ell d) e^{j(a+kb)(c+\ell d)}$$

with $k \in [0, \ldots, N-1]$, $\forall k$, wherein a represents position of the starting bin of the histogram, b represents bin width and N represents quantity of bins in the histogram, and further wherein c represents the lowest considered frequency and d is a discretization step value.

Thus, applied to the complex conjugate of the resulting characteristic function CFr, it leads to the following expression of the probability mass function $P_{SINR}$ of said Signal-to-Interference-plus-Noise Ratio:

$$P_{SINR}(a + kb) = \frac{d}{2\pi} \sum_{\ell=0}^{N-1} \overline{CFr}(c + \ell d) e^{j(a+kb)(c+\ell d)}$$

wherein N represents quantity of bins in the histogram used to represent the probability mass function $P_{SINR}$ in the database DB 150.

As a remark, the probability mass function may be represented in the form of a histogram with non-uniform bin width. Using uniform bin width advantageously allows reducing computational complexity by way as described hereafter.

In a particular embodiment, the second device computes the probability mass function of said Signal-to-Interference-plus-Noise Ratio from the complex conjugate of the resulting characteristic function CFr, by applying an Inverse Fast Fourier Transform (IFFT), which allows a cost-effective implementation in terms of processing time and resources.

More precisely, still considering that X is a real random variable, the probability mass function $P_X$ is defined as follows:

$$P_X = \frac{1}{b} \cdot IFFT(\overline{\varphi}_X \otimes e^{jdaL}) \otimes e^{jc(a+bK)}$$

wherein L is a vector such that L=[0, . . . , N−1] and K is also a vector such that K=[0, . . . , N−1], and wherein ⊗ represents a term-by-term product, and wherein $$d = \frac{2\pi}{bN}$$

Applied to the probability mass function $P_{SINR}$ of said Signal-to-Interference-plus-Noise Ratio, it leads to the following relationship:

$$P_{SINR} = \frac{1}{b} \cdot IFFT(\overline{CFr} \otimes e^{jdaL}) \otimes e^{jc(a+bK)}$$

In a particular embodiment, so that the resulting characteristic function CFr is uniformly sampled between [−π/b, π/b], which is a sufficient domain of definition for a frequency domain representation of a signal with sampling rate equal to b, which is the case for the probability mass function $P_{SINR}$, the following relationship is enforced by the second device:

$$c = -\left(1 - \frac{1}{N}\right)\frac{\pi}{b}$$

In an optional step S416, the second device updates the database DB 150 by merging the probability mass function computed in the step S415 with the probability mass function data present in the database DB 150. This step S416 is optional in the sense that the second device may only rely, later on, on the probability mass function $P_{SINR}$ of said Signal-to-Interference-plus-Noise Ratio as obtained in the step S415 (i.e. without merging with any probability mass function data present in the database DB 150).

The database DB 150 preferably contains an indication of the quantity of updates Nup of the database DB 150 that have already been performed. The database DB 150 further contains information representative of the probability mass function of the logarithm of the Signal-to-Interference-plus-Noise Ratio achieved over past transmissions for which measurements (as explained with respect to FIG. 3A) have been previously performed.

More precisely, merging two probability mass functions $P_X(x)$, as obtained in the step S414, and $Q_X(x)$, as present in the database DB 150, when X is a discrete random variable, is performed as follows:

$$Q_X(x) \leftarrow Q_X(x) + \frac{1}{Nup}(P_X(x) - Q_X(x))$$

wherein ← means overwriting.

In a variant, a weighting factor μ is applied as follows:

$$Q_X(x) \leftarrow Q_X(x) + \mu(P_X(x) - Q_X(x))$$

wherein μ∈[0,1] and wherein x=a+kb in such a database update context, with k E [0, . . . , N−1], ∀k.

When overwriting the probability mass functions $Q_X(x)$, the quantity of updates Nup of the database DB 150 is also incremented by one unit so as to reflect that a new update of the database DB 150 has been performed.

FIGS. 5A and 5B schematically represent two complementary algorithms for updating the database DB 150, according to the second embodiment. In this second embodiment, the first device gathers the measurements for the couple formed by the useful signals power Pu and the in-transmission interference power Pi', as well as the measurements for the out-transmission interference power Pi". Then the first device merges the measurements of the in-transmission interference power Pi' and of the out-transmission interference power Pi" so as to form the measurements of interference power Pi. Then the first device transmits the measurements data for the useful signals power Pu and for the interference power Pi to the second device, which then processes said data so as to be able to update the database DB 150. In other words, the second embodiment is close to the first embodiment, with a different distribution of processing between the first and second devices.

Thus, referring to FIG. 5A, in a step S501, the first device gathers measurements data as described hereinbefore with respect to FIG. 3A. The step S501 is identical to the step S401. Then, in a step S502, the first device merges the data related to the in-transmission interference power Pi' and the data related to the out-transmission interference power Pi" so as to form the set of data related, considered as a whole, to the interference power Pi={Pi', Pi"}. The step S502 is identical to the step S412, except that it is performed by the first device instead of being performed by the second device. Then, in a step S503, the first device transmits the data relating to the useful signals power Pu (obtained from the measurements of the total power Pt), as well as the set of data related to the interference power Pi (after merge), to the second device. The algorithm of FIG. 5A can be reiterated over time so as to keep the second device up-to-date with respect to the power measurements data.

Turning to FIG. 5B, in a step S511, the second device receives the data transmitted by the first device in the step S503. In a step S512, the second device determines the information representative of the first characteristic function CFu of the logarithm of the received data relating to the useful signals power Pu and the information representative of the second characteristic function CFi relating to the opposite of the logarithm of the received data relating interference power Pi. In a variant embodiment, the second device simply uses the logarithm of the interference power Pi instead of the opposite of the logarithm of the interference power Pi. In a variant embodiment, the information representative of the characteristic functions in question is either the coefficients of said characteristic functions or the coefficients of the respective complex conjugate of said characteristic functions. In other words, the step S512 is identical to the step S413. In a step S513, the second device merges the characteristic function CFu and the characteristic function CFi, or their complex conjugates, to obtain the resulting characteristic function CFr. Hence, the resulting characteristic function CFr, or the complex conjugate thereof, is the characteristic function, or respectively the complex conjugate thereof, of the logarithm of the Signal-to-Interference-plus-Noise Ratio achieved via the wireless transmission channel that led to the measurements representative of the useful signals power Pu and of the interference power Pi. In other words, the step S513 is identical to the step S414. In a step S514, the second device computes the probability mass function of said Signal-to-Interference-plus-Noise Ratio from the resulting characteristic function CFr, or from the complex conjugate thereof. In other words, the step S514 is identical to the step S415. In a step S515, the second device updates the database DB 150 by merging the probability mass function computed in the step S514 with the probability mass function data present in the database DB 150. In other words, the step S515 is identical to the step S416 (and is similarly optional).

FIGS. 6A and 6B schematically represent two complementary algorithms for updating the database DB 150, according to the third embodiment. In this third embodiment, the first device gathers the measurements for the couple formed by the useful signals power Pu and the in-transmission interference power Pi', as well as the measurements for the out-transmission interference power Pi". Then the first device merges the measurements of the in-transmission interference power Pi' and of the out-transmission interference power Pi" so as to form the measurements of interference power Pi, identically as in the second embodiment. Then, the first device determines the information representative of the first characteristic function CFu of the logarithm of the received data relating to the useful signals power Pu and the information representative of the second characteristic function CFi relating to the opposite of the logarithm of the received data relating interference power Pi (or in a variant, to the logarithm of the interference power Pi). Then the first device transmits said characteristic function information to the second device. In other words, the third embodiment is close to the first and second embodiments, with a different distribution of processing between the first and second devices.

Thus, referring to FIG. 6A, in a step S601, the first device gathers measurements data as described hereinbefore with respect to FIG. 3A. The step S601 is identical to the step S401. Then, in a step S602, the first device merges the data related to the in-transmission interference power Pi' and the data related to the out-transmission interference power Pi" so as to form the set of data related, considered as a whole, to the interference power Pi={Pi', Pi"}. The step S602 is identical to the step S412, except that it is performed by the first device instead of being performed by the second device. Then, in a step S603, the first device determines the information representative of the first characteristic function CFu of the logarithm of the received data relating to the useful signals power Pu and the information representative of the second characteristic function CFi relating to the opposite of the logarithm of the received data relating interference power Pi. In a variant embodiment, the first device simply uses the logarithm of the interference power Pi instead of the opposite of the logarithm of the interference power Pi. In a variant embodiment, the information representative of the characteristic functions in question is either the coefficients of said characteristic functions or the coefficients of the respective complex conjugate of said characteristic functions. In other words, the step S603 is identical to the step S413, except that it is performed by the first device instead of being performed by the second device. Then, in a step S604, the first device transmits the information representative of the characteristic functions in question, to the second device. It has to be noted that information representative of the complex conjugates of said characteristic functions is information representative of the characteristic functions in question. The algorithm of FIG. 6A can be reiterated over time so as to keep the second device up-to-date with respect to the characteristic functions in question.

Turning to FIG. 6B, in a step S611, the second device receives the information representative of the characteristic functions in question, which was transmitted by the first device in the step S604. In a step S612, the second device merges the characteristic function CFu and the characteristic function CFi, or their complex conjugates, to obtain the resulting characteristic function CFr. Hence, the resulting characteristic function CFr, or the complex conjugate thereof, is the characteristic function, or respectively the complex conjugate thereof, of the logarithm of the Signal-to-Interference-plus-Noise Ratio achieved via the wireless transmission channel that led to the measurements representative of the useful signals power Pu and of the interference power Pi. In other words, the step S612 is identical to the step S414. In a step S613, the second device computes the probability mass function of said Signal-to-Interference-plus-Noise Ratio from the resulting characteristic function CFr, or from the complex conjugate thereof. In other words, the step S613 is identical to the step S415. In a step S614, the second device updates the database DB 150 by merging the probability mass function computed in the step S613 with the probability mass function data present in the database DB 150. In other words, the step S614 is identical to the step S416 (and is similarly optional).

FIGS. 7A and 7B schematically represent two complementary algorithms for updating the database DB 150, according to the fourth embodiment. In this fourth embodiment, the first device gathers the measurements for the couple formed by the useful signals power Pu and the in-transmission interference power Pi', as well as the measurements for the out-transmission interference power Pi". Then the first device merges the measurements of the in-transmission interference power Pi' and of the out-transmission interference power Pi" so as to form the measurements of interference power Pi, identically as in the second and third embodiments. Then, the first device determines the information representative of the first characteristic function CFu of the logarithm of the received data relating to the useful signals power Pu and the information representative of the second characteristic function CFi relating to the opposite of the logarithm of the received data relating interference power Pi (or in a variant, to the logarithm of the interference power Pi), as in the third embodiment. Then the first device merges the characteristic function CFu and the characteristic function CFi, or their complex conjugates, to obtain the resulting characteristic function CFr. Then the first device transmits information representative of said resulting characteristic function CFr to the second device. It has to be noted that information representative of the complex conjugate of said resulting characteristic function CFr is information representative of the resulting characteristic function CFr in question. In other words, the fourth embodiment is close to the first, second and third embodiments, with a different distribution of processing between the first and second devices.

Thus, referring to FIG. 7A, in a step S701, the first device gathers measurements data as described hereinbefore with respect to FIG. 3A. The step S701 is identical to the step S401. Then, in a step S702, the first device merges the data related to the in-transmission interference power Pi' and the data related to the out-transmission interference power Pi" so as to form the set of data related, considered as a whole, to the interference power Pi={Pi', Pi"}. The step S702 is identical to the step S412, except that it is performed by the first device instead of being performed by the second device. Then, in a step S703, the first device determines the information representative of the first characteristic function CFu of the logarithm of the received data relating to the useful signals power Pu and the information representative of the second characteristic function CFi relating to the opposite of the logarithm of the received data relating interference power Pi. In a variant embodiment, the first device simply uses the logarithm of the interference power Pi instead of the opposite of the logarithm of the interference power Pi. In a variant embodiment, the information representative of the characteristic functions in question is either the coefficients of said characteristic functions or the coefficients of the respective complex conjugate of said characteristic functions. In other words, the step S703 is identical to the step S413, except that it is performed by the first device instead of being performed by the second device. Then, in a step S704, the first device merges the characteristic function CFu and the characteristic function CFi, or their complex conjugates, to obtain the resulting characteristic function CFr, or respectively complex conjugate thereof. Hence, the resulting characteristic function CFr, or the complex conjugate thereof, is the characteristic function, or respectively the complex conjugate thereof, of the logarithm of the Signal-to-Interference-plus-Noise Ratio achieved via the wireless transmission channel that led to the measurements representative of the useful signals power Pu and of the interference power Pi. In other words, the step S704 is identical to the step S414, except that it is performed by the first device instead of being performed by the second device. Then, in a step S705, the first device transmits information representative of the resulting characteristic function CFr to the second device. The algorithm of FIG. 7A can be reiterated over time so as to keep the second device up-to-date with respect to the resulting characteristic function CFr.

Turning to FIG. 7B, in a step S711, the second device receives the information representative of the resulting characteristic function CFr, which was transmitted by the first device in the step S705. In a step S712, the second device computes the probability mass function of said Signal-to-Interference-plus-Noise Ratio from the resulting characteristic function CFr, or from the complex conjugate thereof. In other words, the step S712 is identical to the step S415. In a step S713, the second device updates the database DB 150 by merging the probability mass function computed in the step S712 with the probability mass function data present in the database DB 150. In other words, the step S713 is identical to the step S416 (and is similarly optional).

FIG. 8 schematically represents an algorithm for updating the database DB 150, according to the fifth embodiment. In this fifth embodiment, the whole processing, from making the relevant power measurements as already described up to updating the database DB 150, is performed by a single device, namely the wireless radio unit $WRU_{A1}$ in view of FIG. 1B.

In a step S801, the wireless radio unit $WRU_{A1}$ gathers measurements data as described hereinbefore with respect to FIG. 3A. The step S801 is identical to the step S401. Then, in a step S802, the wireless radio unit $WRU_{A1}$ merges the data related to the in-transmission interference power Pi' and the data related to the out-transmission interference power Pi" so as to form the set of data related, considered as a whole, to the interference power Pi={Pi', Pi"}. The step S802 is identical to the step S412, except that it is performed by the same device as the one making the relevant power measurements. Then, in a step S803, the wireless radio unit $WRU_{A1}$ determines the information representative of the first characteristic function CFu of the logarithm of the received data relating to the useful signals power Pu and the information representative of the second characteristic function CFi relating to the opposite of the logarithm of the received data relating interference power Pi. In a variant embodiment, the wireless radio unit $WRU_{A1}$ simply uses the logarithm of the interference power Pi instead of the opposite of the logarithm of the interference power Pi. In a variant embodiment, the information representative of the characteristic functions in question is either the coefficients of said characteristic functions or the coefficients of the respective complex conjugate of said characteristic functions. In other words, the step S803 is identical to the step S413, except that it is performed by the same device as the one making the relevant power measurements. Then, in a step S804, the first device merges the characteristic function CFu and the characteristic function CFi, or their complex conjugates, to obtain the resulting characteristic function CFr, or respectively complex conjugate thereof. Hence, the resulting characteristic function CFr, or the complex conjugate thereof, is the characteristic function, or respectively the complex conjugate thereof, of the logarithm of the Signal-to-Interference-plus-Noise Ratio achieved via the wireless transmission channel that led to the measurements representative of the useful signals power Pu and of the interference power Pi. In other words, the step S804 is identical to the step S414, except that it is performed by the same device as the one making the relevant power measurements. Then, in a step S805, the wireless radio unit $WRU_{A1}$ computes the probability mass function of said Signal-to-Interference-plus-Noise Ratio from the resulting characteristic function CFr, or from the complex conjugate thereof. In other words, the step S805 is identical to the step S415, except that it is performed by the same device as the one making the relevant power measurements. In a step S806, the wireless radio unit $WRU_{A1}$ updates the database DB 150 by merging the probability mass function computed in the step S805 with the probability mass function data present in the database DB 150. In other words, the step S806 is identical to the step S416 (and is similarly optional), except that it is performed by the same device as the one making the relevant power measurements.

Considering that the probability mass function data stored the database DB 150 are in histogram format with uniform bin width, it allows computing average probability of error on the transmission channel between the wireless radio unit $WRU_{A1}$ (or any other wireless radio unit WRU of the wireless communication system 100) and any other wireless radio unit WRU (such as the wireless radio unit $WRU_{B1}$). For example, when a BPSK (Binary Phase Shift Keying) modulation is used for transmission on the transmission channel, the error rate for the transmission over an additive white Gaussian noise channel is as follows:

$$\tfrac{1}{2}*\mathrm{erfc}(\sqrt{(\tfrac{1}{2}*\mathrm{SINR})})$$

where erfc(.) is the complementary error function. The average error rate is given by the weighted sum over all the histogram elements, wherein each element of the sum is defined as follows:

$$P_{SINR}(k)*\tfrac{1}{2}*\mathrm{erfc}(\sqrt{(\tfrac{1}{2}*\mathrm{SINR}(k))})$$

where SINR(k) is the value of the SINR associated with the k-th bin of $P_{SINR}$.

It also allows determining a worst case scenario from a quantile (e.g. 10%-ile) of the Signal-to-Interference-plus-Noise Ratio. Indeed, one can find the value of index kq such that the cumulative sum over the values $P_{SINR}(k)$ from 1 to k exceeds said quantile value. The SINR value associated with the kq-th bin of $P_{SINR}$ is then used as reference value of SINR for performance computation, for example by computing:

$$\tfrac{1}{2}*\mathrm{erfc}(\sqrt{(\tfrac{1}{2}*\mathrm{SINR}(kq))})$$

The Signal-to-Interference-plus-Noise Ratio related data stored in the database DB 150 may be used to predict performance of a frequency hopping mechanism implemented by the wireless communication system 100. For example, by considering performance obtained on each hop from the previously described methods, it is possible to compute the probability to have only errors on a given time window by multiplying the obtained probabilities of error associated with the transmission attempts within said window and according to the frequency and time resource resulting from the frequency hopping pattern.

According to another example already addressed herein regarding wayside base stations deployed along railroads, the Signal-to-Interference-plus-Noise Ratio related data stored in the database DB 150 may also be used to predict and monitor on long-term basis clusters that are likely to experience wireless transmissions difficulties, and apply countermeasures for improving deployment of the wireless radio unit WRU of the wireless communication system 100. For example, the system probability of error is computed from the database, and if this probability of error becomes worse than a given threshold, an alarm is displayed to an operator.

The invention claimed is:

1. A method for building Signal-to-Interference-plus-Noise Ratio data from power measurements data, the Signal-to-Interference-plus-Noise Ratio data relating to a transmission channel in a wireless communication system, the method being implemented by a device of the wireless communication system or cooperatively by plural devices of the wireless communication system, characterized in that the method comprises:

gathering first power measurements data of total power received during communications performed on the transmission channel;

gathering second power measurements data of in-transmission interference power received during said communications, as many second power measurements data being gathered as first power measurements data;

computing third power measurements data of useful power, by subtracting the second power measurements data from the first power measurements data;

gathering fourth power measurements data of out-transmission interference power received out of said communications on the transmission channel;

merging the second power measurements data and the fourth power measurements data so as to form a set of fifth interference power data;

computing a first characteristic function, or complex conjugate thereof, of the logarithm of the computed third power measurements data, and computing a second characteristic function, or complex conjugate thereof, of the logarithm of the fifth power measurements data or of the opposite of the logarithm of the fifth power measurements data;

building a third characteristic function, or complex conjugate thereof, of the logarithm of Signal-to-Interference-plus-Noise Ratio data related to the transmission channel, by performing a term-by-term product of the first characteristic function and the second characteristic function, or complex conjugates thereof, when relying on the logarithm of the fifth power measurements data, or by performing a term-by-term division of the first characteristic function and the second characteristic function, or complex conjugates thereof, when relying on the opposite of the logarithm of the fifth power measurements data; and computing a first probability mass function from the third characteristic function, or complex conjugate thereof.

2. The method according to claim 1, wherein the method further comprises merging the computed first probability mass function and a second probability mass function representative of Signal-to-Interference-plus-Noise Ratio data previously acquired with respect to the transmission channel.

3. The method according to claim 1, wherein the first probability mass function $P_{SINR}$, represented in a form of a histogram with uniform bins width, is computed as follows:

$$P_{SINR} = \frac{1}{b} \cdot IFFT(\overline{CFr} \otimes e^{jdaL}) \otimes e^{jc(a+bK)}$$

wherein L is a vector such that L=[0, ..., N−1], K is also a vector such that K=[0, ..., N−1], and ⊗ represents a term-by-term product, and wherein $\overline{CFr}$ is the complex conjugate of the third characteristic function, a represents position of a starting bin of the histogram, b represents bin width, N represents quantity of bins in the histogram, c represents the lowest considered frequency and d is a discretization step value.

4. The method according to claim 3, wherein the lowest considered frequency c is set such that:

$$c = -\left(1 - \frac{1}{N}\right)\frac{\pi}{b}.$$

5. The method according to claim 1, wherein the first probability mass function $P_{SINR}$, represented in a form of a histogram with uniform bins width, is computed as follows:

$$P_{SINR}(a+kb) = \frac{d}{2\pi}\sum_{\ell=0}^{N-1} \overline{CFr}(c+\ell d)e^{j(a+kb)(c+\ell d)}$$

with k∈[0, ..., N−1], ∀k, wherein $\overline{CFr}$ is the complex conjugate of the third characteristic function, a represents position of a starting bin of the histogram, b represents bin width, N represents quantity of bins in the histogram, c represents the lowest considered frequency and d is a discretization step value.

6. The method according to claim 1, wherein the transmission channel is between a first wireless radio unit of the wireless communication system and a second wireless radio unit, and wherein the wireless communication system further comprises a server connected to the first wireless radio unit, and wherein:

the first wireless radio unit gathers the first, second and fourth power measurements data, computes the third measurement data, and transmits to the server the third measurement data associated with the second measurement data, as well as the fourth measurement data; and the server merges the second power measurements data and the fourth power measurements data, computes the first and second characteristic functions, or the complex conjugates thereof, builds the third characteristic function, or complex conjugate thereof, computes the first probability mass function, and merges the computed first probability mass function and the second probability mass function.

7. The method according to claim 1, wherein the transmission channel is between a first wireless radio unit of the wireless communication system and a second wireless radio unit, and wherein the wireless communication system further comprises a server connected to the first wireless radio unit, and wherein:

the first wireless radio unit gathers the first, second and fourth power measurements data, computes the third measurement data, merges the second power measurements data and the fourth power measurements data, and transmits to the server the third measurement data, as well as the fifth measurement data; and the server computes the first and second characteristic functions, or the complex conjugates thereof, builds the third characteristic function, or complex conjugate thereof, computes the first probability mass function, and merges the computed first probability mass function and the second probability mass function.

8. The method according to claim 1, wherein the transmission channel is between a first wireless radio unit of the wireless communication system and a second wireless radio unit, and wherein the wireless communication system further comprises a server connected to the first wireless radio unit, and wherein:

the first wireless radio unit gathers the first, second and fourth power measurements data, computes the third measurement data, merges the second power measurements data and the fourth power measurements data, computes the first and second characteristic functions, or the complex conjugates thereof, and transmits to the server information representative of the first and second characteristic functions; and the server builds the third characteristic function, or complex conjugate thereof, computes the first probability mass function, and merges the computed first probability mass function and the second probability mass function.

9. The method according to claim 1, wherein the transmission channel is between a first wireless radio unit of the wireless communication system and a second wireless radio unit, and wherein the wireless communication system further comprises a server connected to the first wireless radio unit, and wherein:

the first wireless radio unit gathers the first, second and fourth power measurements data, computes the third measurement data, merges the second power measurements data and the fourth power measurements data, computes the first and second characteristic functions, or the complex conjugates thereof, builds the third characteristic function, or complex conjugate thereof, and transmits to the server information representative of the third characteristic function; and the server computes the first probability mass function, and merges the computed first probability mass function and the second probability mass function.

10. The method according to claim 1, wherein the wireless communication system is a cellular telecommunication system and the transmission channel is between wayside base stations deployed along railroads on which trains are travelling and relay stations installed inside the trains so as to enable User Equipment located inside the trains to communicate via the cellular telecommunication system, and wherein the railroads are virtually cut into clusters and the probability mass function data relating to Signal-to-Interference-plus-Noise Ratio is stored in a database for each cluster.

11. The method according to claim 1, wherein the transmission channel is between a first wireless radio unit of the wireless communication system and a second wireless radio unit, and wherein the method is implemented by the first wireless radio unit.

12. A computer program product comprising program code instructions that can be loaded in a programmable device for implementing the method according to claim 11, when the program code instructions are run by the programmable device.

13. Non-transitory information storage medium storing a computer program comprising program code instructions that can be loaded in a programmable device for implementing the method according to claim 11, when the program code instructions are run by the programmable device.

14. A wireless communication system for building Signal-to-Interference-plus-Noise Ratio data from power measurements data, the Signal-to-Interference-plus-Noise Ratio data relating to a transmission channel in the wireless communication system, characterized in that the wireless communication system is such that a device of the wireless communication system or cooperatively plural devices of the wireless communication system comprise:

a processor configured to peform:

gathering first power measurements data of total power received during communications performed on the transmission channel;

gathering second power measurements data of in-transmission interference power received during said communications, as many second power measurements data being gathered as first power measurements data;

computing third power measurements data of useful power, by subtracting the second power measurements data from the first power measurements data;

gathering fourth power measurements data of out-transmission interference power received out of said communications on the transmission channel;

merging the second power measurements data and the fourth power measurements data so as to form a set of fifth interference power data;

computing a first characteristic function, or complex conjugate thereof, of the logarithm of the computed third power measurements data, and computing a second characteristic function, or complex conjugate thereof, of the logarithm of the fifth power measurements data or of the opposite of the logarithm of the fifth power measurements data;

building a third characteristic function, or complex conjugate thereof, of the logarithm of Signal-to-Interference-plus-Noise Ratio data related to the transmission channel, by performing a term-by-term product of the first characteristic function and the second characteristic function, or complex conjugates thereof, when relying on the logarithm of the fifth power measurements data, or by performing a term-by-term division of the first characteristic function and the second characteristic function, or complex conjugates thereof, when relying on the opposite of the logarithm of the fifth power measurements data; and computing a first probability mass function from the third characteristic function, or complex conjugate thereof.

\* \* \* \* \*